US011798034B1

United States Patent
Skoe et al.

(10) Patent No.: US 11,798,034 B1
(45) Date of Patent: Oct. 24, 2023

(54) DIRECTED CONTENT TO ANONYMIZED USERS

(71) Applicant: Google LLC, Mountain View, CA (US)

(72) Inventors: Anders Skoe, Vettre (NO); Melodie M. Chu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 233 days.

(21) Appl. No.: 17/116,154

(22) Filed: Dec. 9, 2020

Related U.S. Application Data

(60) Continuation of application No. 15/955,809, filed on Apr. 18, 2018, now Pat. No. 10,891,657, which is a division of application No. 13/952,836, filed on Jul. 29, 2013, now Pat. No. 9,972,031, which is a continuation of application No. 13/275,943, filed on Oct. 18, 2011, now Pat. No. 8,521,594.

(51) Int. Cl.
*G06Q 30/02* (2023.01)
*G06Q 30/0251* (2023.01)

(52) U.S. Cl.
CPC .................. *G06Q 30/0269* (2013.01)

(58) Field of Classification Search
CPC .................................. G06Q 30/0269
USPC .......................................................... 705/50
See application file for complete search history.

(56) References Cited

U.S. PATENT DOCUMENTS

| | | | |
|---|---|---|---|
| 7,996,521 B2 | 8/2011 | Chamberlain et al. | |
| 8,468,271 B1 | 6/2013 | Panwar et al. | |
| 8,935,797 B1 | 1/2015 | Silver et al. | |
| 2006/0287915 A1 | 12/2006 | Boulet et al. | |
| 2008/0040175 A1 | 2/2008 | Dellovo | |
| 2008/0177600 A1 | 7/2008 | McCarthy | |
| 2009/0129377 A1 | 5/2009 | Chamberlain et al. | |
| 2009/0216749 A1 | 8/2009 | Hardt | |
| 2010/0106606 A1* | 4/2010 | Filice ................. | G06Q 30/0251 705/14.73 |
| 2011/0246267 A1* | 10/2011 | Williams ................ | G06Q 30/08 705/14.4 |
| 2011/0258049 A1 | 10/2011 | Ramer et al. | |
| 2013/0179513 A1* | 7/2013 | Furukawa ............. | H04L 67/535 709/204 |
| 2014/0006951 A1 | 1/2014 | Hunter et al. | |
| 2014/0223575 A1* | 8/2014 | Nandi ................ | H04N 21/4826 726/27 |

OTHER PUBLICATIONS

Indian Patent Office No. 1209/DEL/2011, filed Apr. 25, 2011, 37 pages (Year: 2011).*
Wondracek et al. "A Practical Attack to De-Anonymize Social Network Users", 2010 IEEE Symposium on Security and Privacy, IEEE Computer Society, Apr. 7, 2010, pp. 223-238 (Year: 2010).*

* cited by examiner

*Primary Examiner* — James D Nigh
(74) *Attorney, Agent, or Firm* — Fish & Richardson P.C.

(57) ABSTRACT

A computer-implemented method for identifying directed content without access to personally-identifiable information of a user includes receiving a group identifier that identifies a group to which the user belongs and an identifier for a device of the user; selecting content that is determined to be responsive to preferences of the group, without using information that identifies the user; and providing the selected content for display on the device of the user.

18 Claims, 6 Drawing Sheets

DIRECTED CONTENT TO ANONYMIZED USERS

CROSS-REFERENCE TO RELATED APPLICATIONS

This application is a continuation of U.S. application Ser. No. 15/955,809, filed Apr. 18, 2018, which is a divisional of U.S. application Ser. No. 13/952,836, filed Jul. 29, 2013, which is a continuation of U.S. application Ser. No. 13/275,943, filed Oct. 18, 2011, the contents of each are incorporated by reference herein.

BACKGROUND

Internet advertising has become a significant source of revenue for publishers of electronic content. Publishers and advertisers alike value the precise information that internet advertising provides. For advertisers, it gives more information on the return they receive from the resources spent on the advertisements (ads). For publishers, the more users view and click on ads on the publishers' websites, the more the publishers can earn. Thus, the more directed the ads are to the user consuming the publisher content, the more effective the ads can be for both parties. Such techniques can also benefit the users by presenting them with ad content that is particularly useful to them, and aimed at addresses their current needs.

Publishers often have information about the users viewing their sites that can be used to direct the ads shown to them. But frequently, the ad content is provided by an outside source. Publishers are often hesitant to share all the information they have about their users for various reasons. At the same time, they would still prefer to give their users the benefits of having the ads that are directed in a meaningful way.

SUMMARY

This document discusses systems and techniques by which on-line advertisements can be directed to a user's interests anonymously. For example, a publisher that has access to information about individual users may place the users into various groups based on that information (e.g., demographic information), and where the groups have characteristics that are matched to the members of the groups. When users view content provided by the publisher, the publisher may then pass an ID for the group to an ad service, rather than an ID for the particular user, and the ad service may analyze activities by members of the group to better select ads that might be relevant to members of the group.

In one example, a computer-implemented method for identifying directed content without access to personally-identifiable information of a user is disclosed. The method includes receiving, at a computer server system, a group identifier that identifies a group to which the user belongs and information that identifies a computing device that corresponds to the user. The method also includes identifying with the computer server system preferences of the group from information received from a third party about the group, from observations made with the computer server system about reactions by members of the group to content provided to the members of the group, or both; selecting with the computer server system content by determining that the content is determined to be responsive to the preferences of the group, without using information that identifies the user; providing the selected content for display on the device of the user; and receiving information about a manner in which the user responds to the content and updating, in the computer server system, information about the preferences of the group.

In another implementation, a computer-implemented method is disclosed for identifying directed content without access to personally-identifiable information of a user. The method includes receiving a group identifier that identifies a group to which the user belongs and an identifier for a device of the user; selecting content that is determined to be responsive to preferences of the group, without using information that identifies the user; and providing the selected content for display on the device of the user. The method can also include receiving the group identifier and providing content for display on devices of a plurality of users; identifying activity of the plurality of users with respect to the provided content; and updating stored characteristics that describe preferences of the group based on the identified activity. In certain aspects, the activity of the plurality of users comprises click-through rates on advertisements displayed to the users. In addition, the method can include receiving information that identifies characteristics of the group, but the characteristics of the group cannot be identified form the received information.

In one or more aspects, the selected content comprises one or more electronic advertisements. The one or more electronic advertisements can be selected by matching keywords for the advertisements with identified preferences of the group. Also, the preferences of the group can be identified based at least in part on prior selections of advertisements having described characteristics by members of the group. In other aspects, receiving a group identifier that identifies a group to which the user belongs comprises receiving an HTTP request from a browser executing on the device, the HTTP request including content received by the device from a publisher that has provided content to the device to which the selected content is to be directed, and wherein the method further comprises selecting the content to match the content from the publisher.

In yet another implementation, a computer-implemented system is disclosed. The system includes a publisher front-end accessible to on-line publishers of information, and arranged to receive from the on-line publishers of information a plurality of group identifiers that each identify a group to which one or more users user belong; an interface arranged to receive, at a time one of the one or more users accesses content from one of the on-line publishers, information that identifies one of the groups but does not identify the user; and a content selection system to select content to be provided to the user for presentation with the content from the one of the on-line publishers, the selected content being determined to match preferences associated with the one of the groups.

In some aspects, the content selection system is programmed to associate activity of users of a group with their respective group, to update stored characteristics of the group based on the associated activity, and to subsequently select content to be provided to users in the groups based on the updated stored characteristics. Also, the preferences associated with the one of the groups can be determined based on click-through rates on advertisements displayed to users in the one of the groups. Moreover, the publisher front-end can be programmed to receive information that implies characteristics of the group and the content selection system is programmed to select content using the characteristics, but wherein the characteristics of the group cannot be identified from the received information In certain aspects, the selected content comprises one or more electronic advertisements. Also the advertisements can be selected by matching keywords for the advertisements with identified preferences of the one of the groups. Moreover, the preferences of the one of the groups can be identified based at least in part on prior selections of advertisements having described characteristics by members of the one of the groups. In yet other aspects, the interface is arranged to receive a group identifier that identifies a group to which a user belongs by receiving an HTTP request from a browser executing on a device of the user, the HTTP request including content received by the device from a publisher that has provided content to the device to which the selected content is to be directed, and the content selection system is programmed to select the content to match the content from the publisher.

In yet another implementation, one or more tangible computer-readable media have recorded thereon instructions. When executed, the instructions perform operations that comprise receiving a group identifier that identifies a group to which the user belongs and an identifier for a device of the user; selecting content that is determined to be responsive to preferences of the group, without using information that identifies the user; and providing the selected content for display on the device of the user. The operations can also include receiving the group identifier and providing content for display on devices of a plurality of users; identifying activity of the plurality of users with respect to the provided content; and updating stored characteristics that describe preferences of the group based on the identified activity.

Other implementations will be understood by reading the claims and description below, in coordination with the accompanying figures.

DETAILED DESCRIPTION

This document describes systems and related techniques for anonymously targeting on-line advertisements. In general, the techniques described here involve using a group identifier in place of user identifiers, which can allow a system to target ads to a user while the user remains anonymous to the system. A publisher of content can submit a request to the system for ads for a website with content. The publisher can include with this request a group identifier to which the user, or the viewer of the content, belongs. The publisher can provide additional information regarding the characteristics of the group, allowing the system to target ads toward those characteristics. Alternatively, or in addition, the system can learn the types of ads that are more effective for a group based on a response to the ads shown to the group. In both instances, the user remains anonymous to the system, but can receive ads targeted to the user.

Figure 1A:
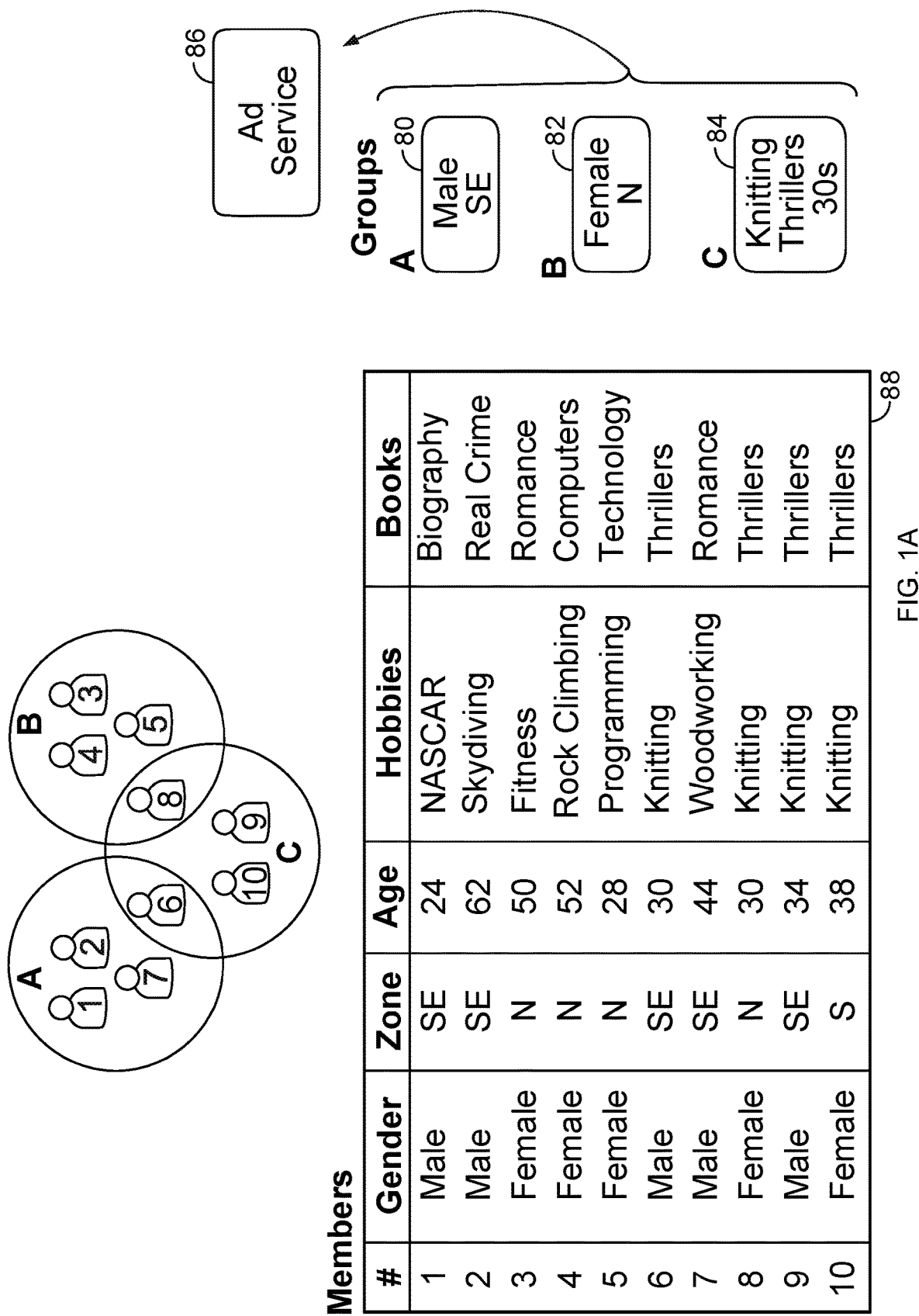
FIG. 1A shows a system by which an on line publisher may target content to its user via a third party without revealing identifying information about the users to the third party.

FIG. 1A shows a system by which an on line publisher may target content to its users via a third party without revealing identifying information about the users to the third party. In this example, the on-line publisher may be an organization that provides content that users may want to read, watch, or otherwise review, and may generate revenue to enable its on line operations by showing advertisements, or ads, with the content. The publisher may not have the wherewithal to operate its own ad system, so it may rely on a specialized ad service 86 for such activities.

The best user experiences, and the best results for the publisher and the ad service 86, occur when the ad service 86 selects and provides ads that are determined to be relevant to each user's particular situation. For example, a user in her 20s is not likely to be responsive to an ad for an arthritis medication, but might be more likely to be responsive to an ad directed to rock climbing or other active lifestyle topic.

The publisher may have information that enables the publisher to make such beneficial targeting decisions. For example, table 88 shows demographic information that the publisher may compile for each of its registered users. Such information may have been obtained by the respective user filling out a demographic profile, such as by indicating their gender and age, among other things. In this example, each member, who is identified by a unique member ID number, has indicated a gender and a particular age (or date of birth). The system may also infer information, such as by inferring a zone (in this example, a general geographic zone of the U.S.) in which the user is located from an IP address that is typically provided when the user access content form the publisher. In this example, the publisher has also received information from the user, or inferred such information, about the user's hobbies and the types of books that the user likes to read. For example, a publisher may have different content areas on its site (e.g., sports, news, lifestyle, etc.) or discussion forums on different topics, and can infer user characteristics based on their interaction with such areas. These examples of user information are very limited, as a vast number of different factors may be used to better deliver content to the publisher's registered users (e.g., where a registered user is someone who registers with and logs onto the publisher's service, or whose visits can otherwise be correlated from visit to visit).

The publisher's user may be comfortable with the publisher having such information, for the terms of use or other considerations may dictate or encourage that the advertiser not share such information with third parties. However, such limits may also limit the enjoyability of the publisher's site for the users, as they may be denied access to personally-relevant information.

To help ameliorate that problem, the publisher may form its users into groups that have certain common characteristics. In this example, the individual users are shown above the table 88 in Ven diagrams, where the ten users are grouped into three groups A-C. The particular example characteristics of each group are shown in boxes 80-84. For example, Group A is made up of male users located in the Southeastern U.S. Group B is made up of female users from the North. And Group C is made up of users of all genders who knit, read thrillers, and are in their 30s. As shown here, certain characteristics of the user may be in multiple groups also. For example, user 6 is a male in the Southeast (group A) and a knitting thriller reader in his 30s (group C).

The manner in which the publisher forms the groups may occur in a variety of manners. For example, the publisher may use known clustering techniques to identify relevant cluster of users who have similar interactions with the publisher's systems. For example, such systems may note that users who almost exclusively visit page on a site about topics X and Y also almost exclusively have user characteristics A and B. For example, the system may indicate that user who happened to visit a couple of pages (that happen to concern osteoporosis and retirement planning) also happen to have a couple common characteristics (e.g., female and in 50s and 60s). Where the correlations are specific enough, and differentiable enough from other possible correlations in the system, those users may be grouped as a cluster.

In certain instances, the tools for identifying groups may be provided from the ad service 86 to the publisher. The ad service may thus "tune" the grouping and the ad selection to interact in an optimal way, but the actual grouping may occur away from the ad service so that the publisher may better maintain anonymity of its user base.

As shown at the right edge of the figure, the publisher may then provide to the ad service 86 certain information about the groups it has formed rather than providing information about individuals in the group (where the member-specific information would have been personally identifiable information or not). As one example, when groups have been formed, the published may provide the ad service 86 with an ID for the group, and may optionally provide information about certain characteristics of the group. For example, very limited personal information such as gender and general geographic area may be provided. As described in more detail below, the ad service 86 may use such information as a starting point for selecting ads to be displayed to users who are identified by the publisher as being members of the group.

Alternatively, no information about the group may be provided by the publisher to the ad service 86. The ad service 86 may then, over time, infer information about the group via their reaction to ads that are served to them. For example, when a member of the group requests a page form the advertiser, the advertiser may request ads from the ad service 86 by providing the group ID to the ad service 86. At first, before it knows anything about the group, the ad service 86 may select a variety of ads that are generalized but are known to induce particular reactions that will allow the ad service 86 to infer preferences of the group. Specifically, over time, members of the group may click on some ads and ignore others, indicating that they like the former and not the latter.

The ad service 86 may then over time build a group profile and serve ads to the profile. The group profile may be treated like an individual's profile would for ad serving. However, certain modifications may also be provided because of the difference between reviewing multiple actions of a group of users versus viewing multiple actions of single users. For example, the ad service 86 may react slower to selections for a group than for an individual under the assumption that there will be more variability in the group, and so its settings for selecting ads should not change quickly due to a couple outlier reactions. Other similar modifications may also be made for purposes of serving the ads.

By the general techniques described here then, a publisher may provide satisfactory directed content to users without having to share their individual information. Where group selection is performed intelligently, the characteristics of the group can represent the characteristics of each individual in the group sufficiently so that usability and performance of the system do not degrade appreciably. At the same time, each user can maintain a substantial level of anonymity. For example, a young person in her 30s may be placed in a group that includes many older people because she wants to retire early and thus reviews a lot of retirement articles. But other particular decisions by the young person (such as her slightly embarrassing love of Justin Bieber music) need not be shared, and slightly embarrassing activity of other members of the group (e.g., love of Conway Twitty music), though perhaps attributed to her for purposes of ad selection if it were prevalent enough in the group, would never be attributed to her personally.

Figure 1B:
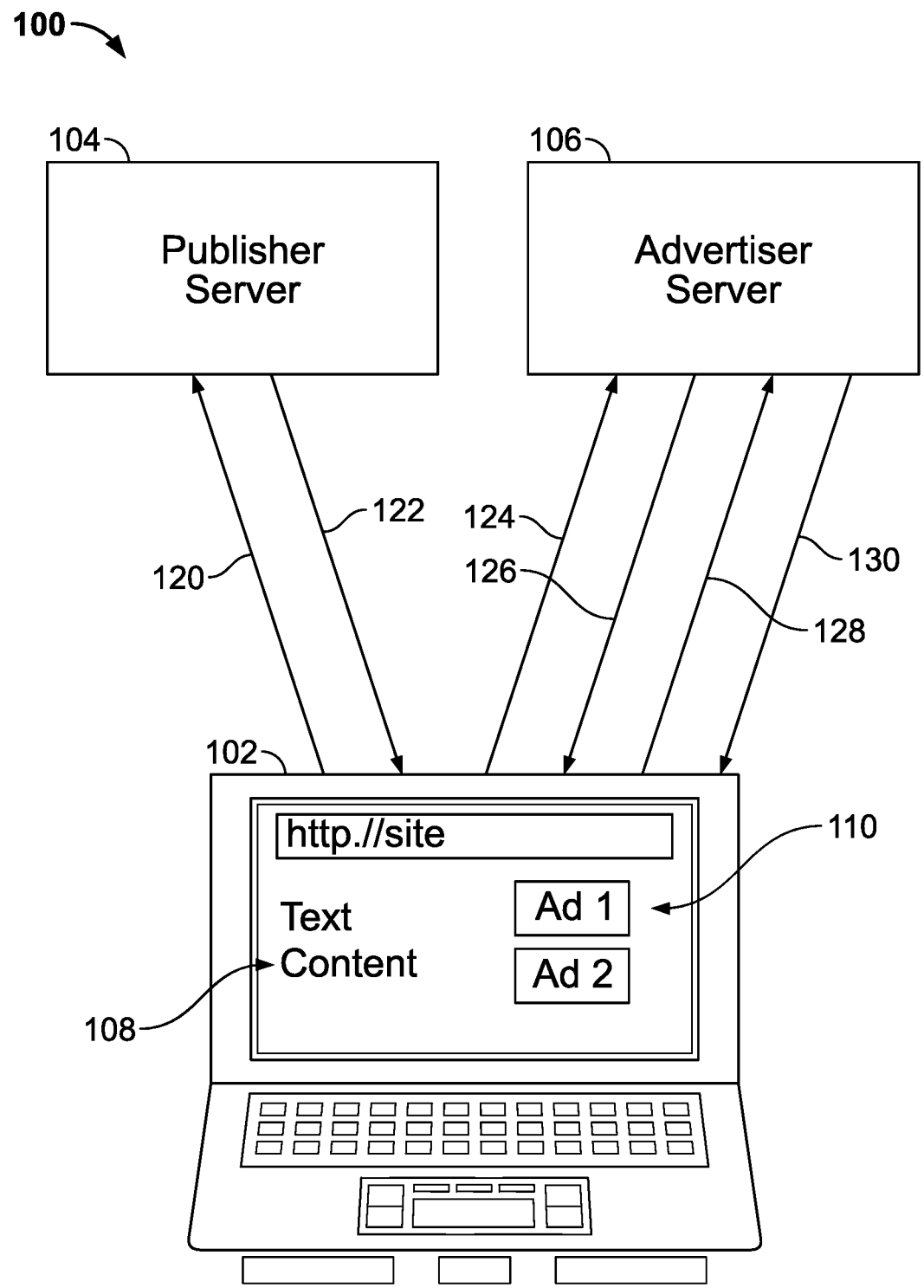
FIG. 1B shows the flow of information to and from a user computing device for delivery of advertising.

FIG. 1B shows the flow of information to and from a user computing device for delivery of advertising. In general, the figure shows various client and server systems and interactions between the client and server systems as part of viewing a web page containing targeted ads. Generally, the system can comprise a client device 102, a publisher server 104 and an advertiser server 106 to provide ads. The system, in selecting ads, may use techniques like those described in FIG. 1A. The particular presentation here shows an example in which a user interacts with the overall system to receive targeted ads that are aimed to be particularly useful to the user, and to thereby increase the utility of the user's experience.

The user in this example can request content from the publisher server 104 through the client device 102. The client device 102 can be any appropriate data processing apparatus that can connect to a network and receive and transmit information through the network. For example, the client device 102 can be a desktop computer, a laptop, a smartphone, a netbook, a tablet computer, or any other appropriate device with network connectivity. The network through which the devices and servers communicate can include, for example, the Internet, an intranet, a LAN, or a wireless cellular network or a combination of networks.

The publisher server 104 can be a server or a system of servers that provides resources from a publisher. The publisher can be any appropriate person or entity that provides resources 108 on the Internet. For example, the publisher can be a news content provider, such as The New York Times, or other magazine or newspaper. The publisher may also provide video content or other forms of content that users wish to review. The resources 108 can be any of the variety resources found on the Internet, including web pages, documents, images, and video, which can be accessed through a uniform resource identifier (URI) such as a uniform resource locator (URL). A large number of publishers operate various web site across the internet and may benefit from using the techniques discussed here.

The client device 102 can request a resource from the publisher server 104, such as via an HTTP request. The request is represented by arrow 120. The publisher server 104 can respond to the request 120 by providing the resource requested. The response is represented by arrow 122. The response 122 can be of a resource 108, renderable and displayable by the client device 102. For example, the client device 102 can obtain HTML and JavaScript code from the publisher server 104, which can include text for a news story and code for requesting the delivery of ads 110 to be displayed at predefined areas on a display of the client device 102.

The ads 110 may have predefined sizes, and can be targeted to content on the page by various techniques. For example, the relevant URL may have been previously crawled by the ad server 104, which system may have performed textual analysis on the content to identify a topic of the content (e.g., retirement planning or osteoporosis). When the resource 108 are rendered by the client device 102, the code for the spots on the page for the ads 110 may call for ads, either directly to the ad server 104 or indirectly via the publisher server 106.

The publisher server's 104 role in providing the ad content may involve identifying which of its members requested the content and identifying a group to which that member belongs (e.g., using the grouping techniques discussed with respect to FIG. 1A). In that regard, the publisher server 104 can request that the space reserved for ads 110 be filled by an advertiser server 106 that provides online ads. The publisher server 104 can request the ads 110 through a function on the resources 108 provided to the client device 102. The function can be, for example, a script written in JavaScript embedded in the resources 108. In one implementation, the client device 102 makes a request to the ad server 106, represented by arrow 124 for ads 110 to display on the client device 102 with the resource 108.

The ad server 106 can return a script or other executable code, represented by arrow 126, that executes to make an ad request with relevant parameters for the request. The parameters can include a URL for the page that the ad is being displayed on, and characteristics relevant to the user of the client device 102. To provide parameters about the user without revealing the identity of the user or information about the user, the script can be provided from the publisher server 104 with a group identifier for a group in which the user has been placed by the publisher server 104. If the user is in multiple groups, the publisher server 104 may select one of those groups. As an example, if the user was placed in Group A largely because users who frequent a particular chat board have been placed in Group A, then the publisher server 104 can forward the Group A identifier when the user is in that chat group or a similar part of the publisher's site. Similarly, the identifier can be for another group that the user was placed in when the user is at a different part of the site. The publisher server 104 may take other factors into account when choosing a group to assign the user to when the user belongs to multiple groups, such as the time of day, recent click activity of the user and other factors.

The group ID can be provided either by providing different JavaScript code or by providing the ID as a parameter that the JavaScript code then passes to the ad server 106. Specifically, the group identifier, along with the other parameters for the ads 110 can be included in a request for ads, represented by arrow 128. As noted above, in some implementations, the groups identified by the group identifiers can have been predefined between the publisher and the advertiser. For example, the publisher may provide the ad server 106 with limited descriptive information about each of, or particular ones of, the identified groups (e.g., gender and region). Alternatively, the publisher may simply identify the presence of the separate groups, and the ad server 106 may infer all characteristics of the group, such as by monitoring activity of all members of the group.

The ad server 106 can receive the request 128 and determine that the request is for a user in, for example, group A. Where the ad server knows that group A represents males who are interested in sports and live in France, the ad server 106 can return ads targeted for males who are interested in sports and live in France. The response is represented by arrow 130. For example, the ads 110 provided with the resource 108 can be for selling French national soccer jerseys or for tickets to watch the Tour de France. The ad server 106 can thus target the advertisements 110 shown with resource 108 on the client device 102 without knowing the identity of the user or knowing particular characteristics of the user.

Alternatively, the publisher can decide to provide or not to provide group characteristics to the ad server 106. As noted, the publisher can simply provide an indication that a particular ad is being requested for a particular group, but not provide any information about the members of the group—leaving the ad server 106 to infer those characteristics on a group-wide level. For example, the ad server 106 can measure the response of users in particular ones of the groups to the ads shown using such metrics such as click through rate to determine which kinds of ads are more effective for members of the group. For example, the publisher server 104 can provide the parameters in the request 128 for ads that the user is in group X. The ad server 106 can note that the user is in group X and show an ad, for example, for French national team soccer jerseys. If the users of group X frequently click on the advertisements for French national team soccer jerseys, the ad server 106 can show similar ads in the future to other members of Group X, for example, an ad for tickets to watch the Tour de France. The actual characteristics of group X, as defined on the publisher server 104 but unknown to the ad server 106, can optionally be presumed. Moreover, particular characteristics, such as the gender of the members of the group, need not be presumed—rather, the ad server 106 can simply perform statistical analysis to identify ads that are similar to ads that receive a positive reaction by members of Group X (e.g., that are clicked). Such a determination that ads are similar to each other can be made by analyzing keywords for the ads, manual review of the ads, and reactions of users outside Group X to the ads—where similar reactions by users sharing similar characteristics will be taken to indicate that particulars are related in some manner.

In another approach, a publisher may initially create user profiles for groups of users, where each profile has a unique ID. The publisher may then provide the profiles to an advertising service, where the profiles may include certain general descriptive information about members of the group (e.g., gender and hobbies). When a user subsequently begins viewing content from the publisher, the publisher may identify the user and may in turn identify the user's group. The publisher may then cause a parameter that describes the user's group to be communicated to the advertising service. The parameter may be, for example, a hashed version of the unique ID for that group. The advertising service may then use that parameter to look up the profile information that was previously provided by the publisher, and may select advertisements (which are subsequently displayed to the user at the same time as the publisher's content) that are directed to the profile information. In certain instances, the advertising service may add to or alter the profile information for particular groups over time, based on observations about the manner in which users within particular groups react to the ads. For example, the advertising service may make certain assumptions about a group that is female and enjoys knitting, but some of those assumptions may be wrong, as borne out by the members clicking on non-traditional advertisements because, perhaps the group is heavily biased toward "urban" or "guerilla" knitters who cover outdoor public items like street signs with their knitted projects—and thus show interests more in line with young edgy artists than with sweater-making grandmothers.

The publisher can also identify certain characteristics of the group members, but may obscure what those characteristics are. For example, the publisher can provide hashed versions of the characteristics. As one example, the publisher can identify characteristic A, which may be an age range, and may classify its users into ranges of 20s, 30s, 40s, etc. When submitting group information about a group that includes users in their 20s, the publisher can name the group Group A, may name the age range Characteristic A, and may hash the string 20s, or some other similar string that represents that characteristic, in a familiar manner into an alphanumeric string from which the string cannot be determined by a recipient of the string. Alternatively to hashing, the Publisher may simply select an arbitrary representation for each of the values for the age range parameters—e.g., 20s can be A, 30s can be E, 40s can be B, and 50s can be C. The ad server 106 may use this information, for example, to analyze the reactions of users in multiple different groups to ads, and knowing perhaps connections between the groups in a general manner—i.e., the ad server 106 will simply know that users in the groups share one or more characteristics, but will not know what those characteristics are.

In yet other implementations certain identifiable information about group characteristics may be provided by the publisher, while other information may be anonymized in the manners discussed above. For example, a publisher's terms of service may establish that its users agree to have certain innocuous and generally-known information about them shared, such as a state or zip code in which they live. The publisher may thus provide the zip code information, either in the definition for the group in which particular users are located, or at ad serving time. In the former instance, the publisher may initially provide a group definition for Group A ahead of time, and indicate that all users in group A live in a certain range of zip codes, e.g., all 553xx zip codes (as determined by a user profile or user IP address). Such information need not define the exact boundaries of the zip codes, so that a particular user may simply be near such zip codes. In such a situation, when, at ad serving time, JavaScript code (or other code) for generating an ad identifies the particular group (where the group ID may be hashed or otherwise formatted to maintain privacy), the ad server 106 will know that the user viewing the ad is in the 553xx zip codes, and may also infer other information form the user's group membership, but will not know anything more specific about the particular user. Alternatively, a parameter that is provided at ad serving time by JavaScript in an iFrame for displaying an ad on a web page may also indicate the zip code range, such as by passing a "zip" parameter with a value of 553xx to the ad server 106 in a URL or other communication from the ad 110 to the ad server 106.

In these manners then, ads can be served to a user with a reasonable degree of directedness, but without having to provide personally identifiable information about the user who is viewing the ad. Certain information may also be provided, and can be combined with anonymized inferences, such as those made across a large group of users, so that the particular characteristics of any user in the group cannot be determined, nor can particular actions (e.g., ad clicking actions) of any particular member of the group.

Figure 2A:
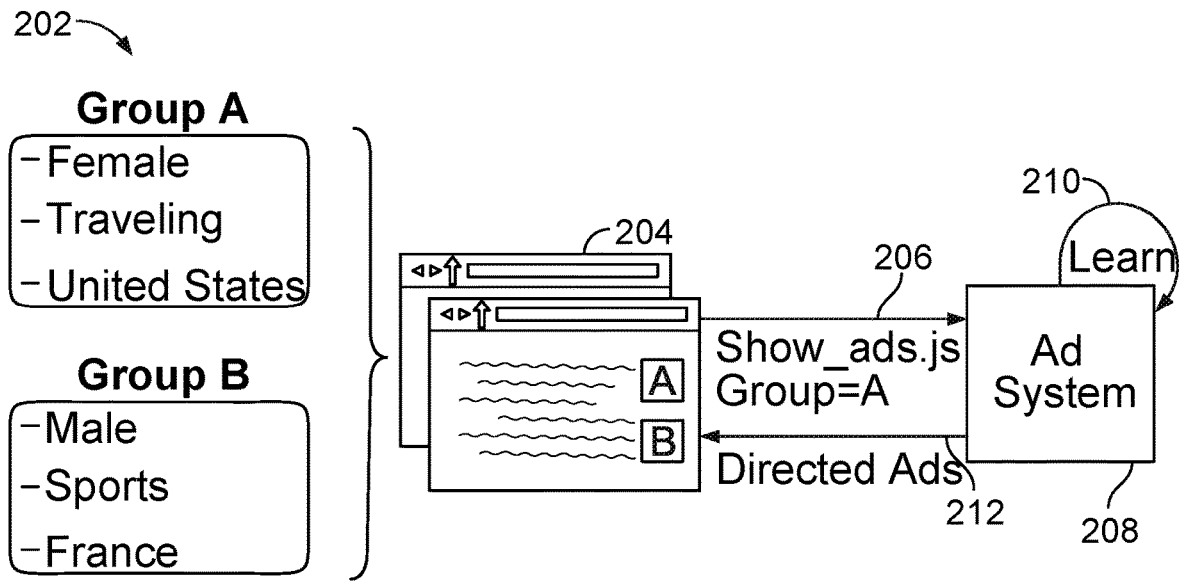
FIGS. 2A and 2B show system by which publishers can manage advertising via a third party ad provider.
Figure 2B:
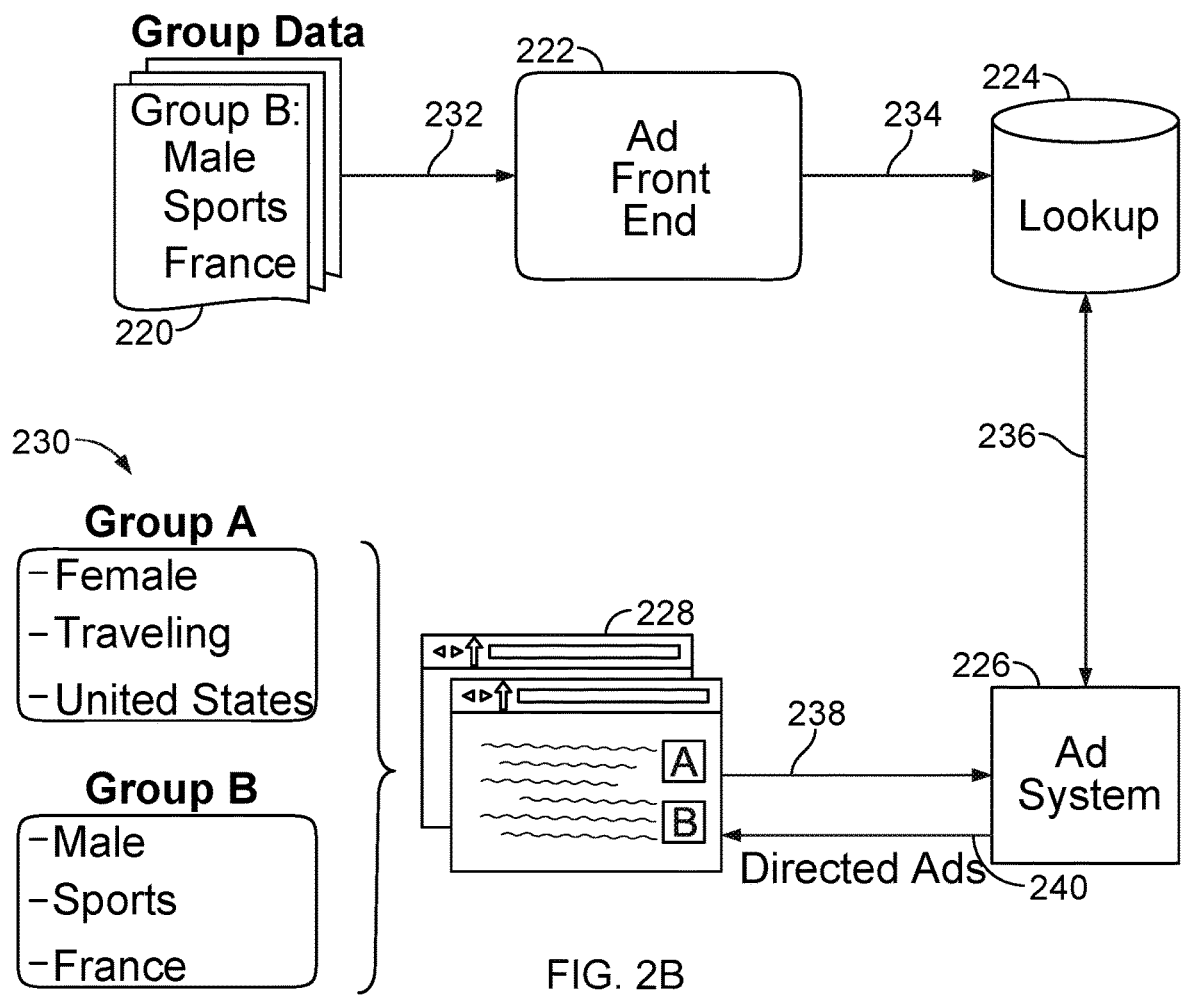

FIGS. 2A and 2B show systems by which publishers can manage advertising via a third-party ad provider. In general, the system in FIG. 2A involves components that may result in a serving of directed ads into an ad space on a publisher page without the need to provide personally identified information, or other personal, user-specific information to an ad system such as ad system 208. The system may thus implement techniques like those discussed above with respect to FIGS. 1A and 1B.

The system here shows a pair of groups 202 that have been formed by a publisher, which may be a publisher of one or more websites, such as a magazine or newspaper publisher. The publisher may have an arrangement with an organization that operates the ad system 208 for purposes of placing directed ads on pages that the publisher serves to its users. The groups 202 include a group A and a group B. Group A includes users of the publisher's website who are females, enjoy traveling, and who live in the United States. Group B includes users who are male, enjoy sports, and live in France. The publisher may have formed groups in various manners, including by analyzing profile data on personal pages for each of the users, and identifying clusters of users around various characteristics, such as gender, hobbies, and geographic location of the users. Alternatively, the publisher may have identified users who spend much of their time or post many comments to particular areas of the publisher's website, such as a travel page or a sports page.

Web pages 204 represent pages that may be rendered on a computer of a user, employing content from the publisher. For example, a user may type in a URL for a domain of a publisher, and then may click on a hyperlink to read a particular article provided by the publisher. For example, the article may relate to a recent World Cup victory by a particular team and may have been clicked on by a user who is in group A for the publisher. Such clicking may cause the page to be rendered, which may in turn caused ads labeled A and B, which are in particular locations on the page, such as in iFrames on the page, to be rendered. Such rendering of the ads may involve the execution of JavaScript code or similar code that may call for particular directed ads from the ad system 208. In this example the show_ads.js JavaScript may cause a parameter of "group=A" to be passed in the communication 206 to the ad system 208— telling the ad system 208 that the particular user is in Group A, but not otherwise providing information about the user. The publisher may have identified the user as being in Group A, e.g., based on a cookie or other information that identified the user and then on looking up that the user was in Group A, and then may have returned the Group A identifier with its response to the user's request for the page.

The communication 206 may also, in some implementations, include a URL for the particular page 204 that has been rendered. The ad system 208 may then select an ad based on such information (e.g., the page identifier and the group identifier). For example, by a learning process 210, the ad system 208 may have previously recognized that users who are identified as being in Group A often click on ads relating to vacation packages. The ad system 208 may also use the URL for the page to identify a topic for the page. For example, the ad system 208 may previously have obtained the text for the article on the World Cup game, and identified topics for the article that include soccer, and the city in which the World Cup game was played. By combining such information, the ad system 208 may select an advertisement for a vacation package (i.e., using knowledge from the learning system that users in Group A often select vacation ads) in the city in which the World Cup game from the article was played (i.e., using analysis of the article to identify the locale of the soccer game as being a topic of the article). The ad system 208 may make such a selection without knowing that the user is interested in traveling, or that the user has ever clicked on an ad relating to travel or has listed travel as an interest in a profile. Rather, the system may simply have noted that users of group A often click on ads for vacation packages, whether that shows an explicit interest in travel or something else.

The ad system 208 may thus return such directed ads by communication 212. The directed ads may then be displayed in locations A and B on the page 204 as advertisements with the article on the World Cup game. As a result, the ads may be particularly relevant for the user in that the user may be interested in the particular city and want to visit it to see sites that are mentioned in the article, and may even want to visit immediately to see the next World Cup game in the series. In this manner then, the system improves the experience for the user without the ad system 208 obtaining particular user-specific information about the user.

FIG. 2B shows a system by which a publisher may provide limited, non-user-specific information to an ad system 226, including by providing a group ID at the time an advertisement is selected and served. In general, the system includes components by which the publisher can define certain categories of information about the groups of users of the publisher's content, and may pass such grouped information to an ad system 226. The ad system 226 will thus direct ads to the categories for the group and may update its direction based on on similarities between actions by members of the group, but will not know particular information about particular members of the group.

As shown, the publisher may again have groups 230 in the form of Group and Group B, which may be the same groups as the groups 202 in FIG. 2A. The publisher may, before users interact with particular content, submit group data 220 via communication 232 to an ad front end 222 of an ad system. For example, the publisher may develop user profiles based, e.g., on profile information provided by members of the group, by observations of the group members (e.g., that all frequent a chat board provided by the publisher on a particular topic), or other such information. The data may be masked in such an operation, such as by hashing the group descriptions (e.g., gender) and/or the particular group values (e.g., male or female). Masking of the descriptions but not the value may provide a certain level of anonymization, and an elevated level of utility in terms of directing ads. Hashing or other techniques may also be used to prevent interception of the data by a third party. Masking of both the descriptions and the values may reduce the ability to direct ads to user, but may provide a higher level of anonymization and security.

In either event, the ad system 226 may provide a look-up 224 or similar database system for tracking the anonymized, grouped characteristics. As one example, the publisher can give the ad system 226 full information about the characteristics for the group, such as by indicating that members of the group live in particular states and/or countries, and are a particular gender. In other examples, certain of the information may be fully or partially hidden from the ad system 226, such as by identifying a characteristic as relating to the geography for the users in the group, but providing the values for the geographies in an obscured manner (e.g., by hashing where the ad system 226 does not have a key). For example, if the publisher provides a plurality of different group IDs to the ad system 226, and some of the groups share a common masked characteristic, the ad system 226 may assume that the characteristic matches, and may introduce such knowledge into an analysis of the actions of users of the two different groups. As one example, the co-variance of different characteristics and values for those characteristics may be tracked within particular groups and across particular groups. For example, if the characteristic identified as 3A2B12CD4 (which might be gender) with value of 123DE410E (which might be female) appears in two different groups, and those group's reaction to ads (e.g., their click-through rates for various ad types) are highly correlated, and are much less highly correlated with groups that don't have the characteristic or have the characteristic (e.g., they did not provide gender, or the publisher determined gender to not have value) but have a different value for the characteristic (e.g., they are listed by the publisher as being male), the two groups may be considered to be coupled on that dimension, and ad behavior of the one group—at least for certain types of ads—may be applied to the other group.

Such in-group and inter-group correlations may be built up through a more complex process using known statistical techniques so as to generate a more complex profile for a group, as compared to the group profile information that the publisher initially provides to the ad system 226. For example, the relationship between two groups discussed here may be replicated in many additional dimensions across different characteristics and between various groups. Where there are many more users and a large number of interactions with the ad system 226, more fine-grained divisions in the data may be performed, and better performance of the overall system and relevance of delivered ads may be achieved.

As with FIG. 2A, code for web pages 228 may be generated by the publisher and sent to a user's browser, and may include ads, A and B, which may be provided with JavaScript or other code that identifies the group for the particular user, in a communication 238 to ad system 226, such as in the parameter of a URL passed to the ad system 226 or other form of request. The ad system 226 may then use information it has developed regarding the particular identified group, and may also use knowledge of the content of the page 228 in order to select and server directed ads 240 to be rendered into the pages 228. In this example, the publisher may cause only a group ID to be provided to the ad system 226 at ad serving time. The group ID can also be hashed, or can be a random string, so as to increase security of the communication to the ad system 226.

Figure 3A:
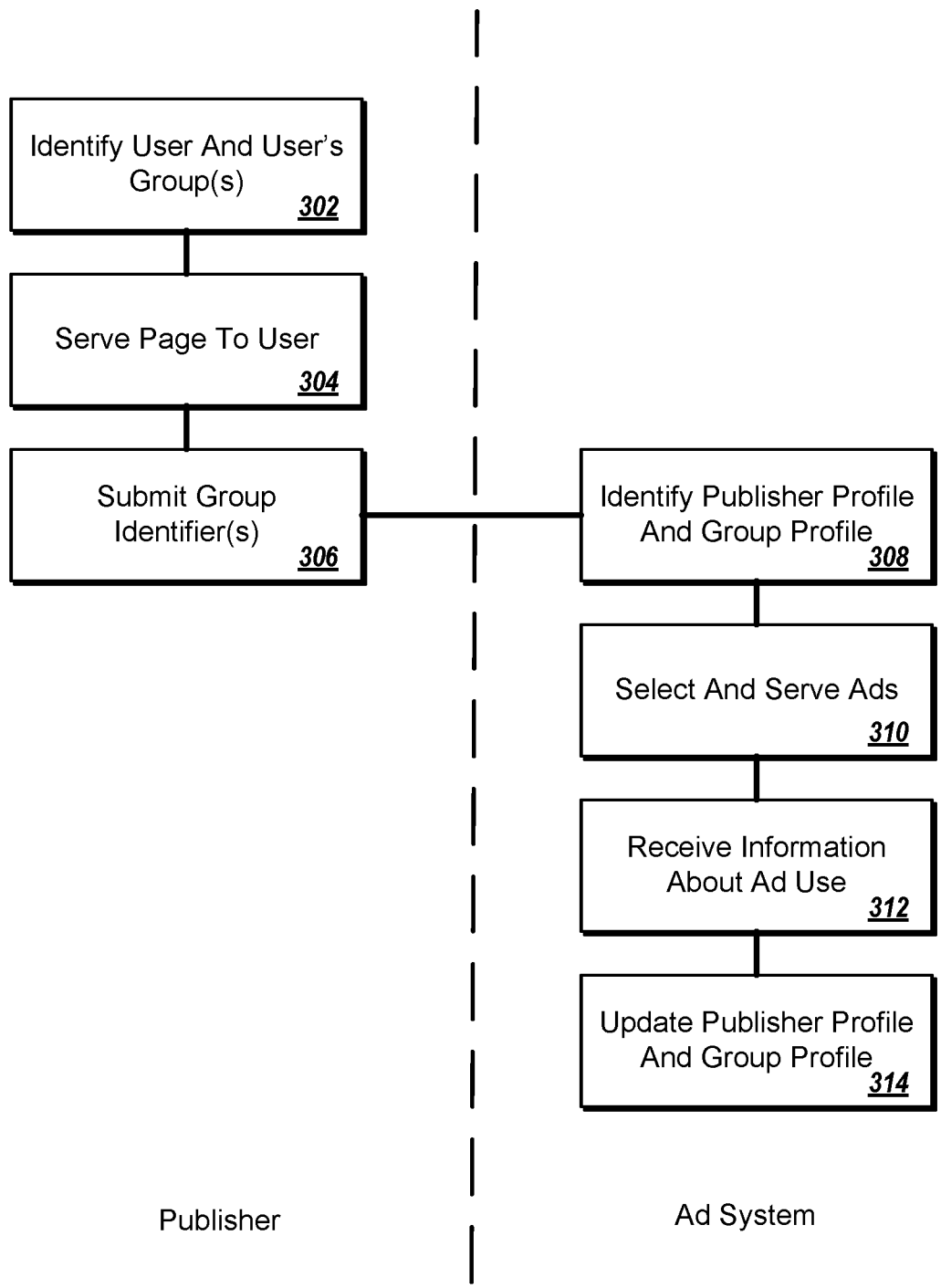
FIGS. 3A and 3B are flow charts of processes for providing grouped user information and targeting advertisements to the group.
Figure 3B:
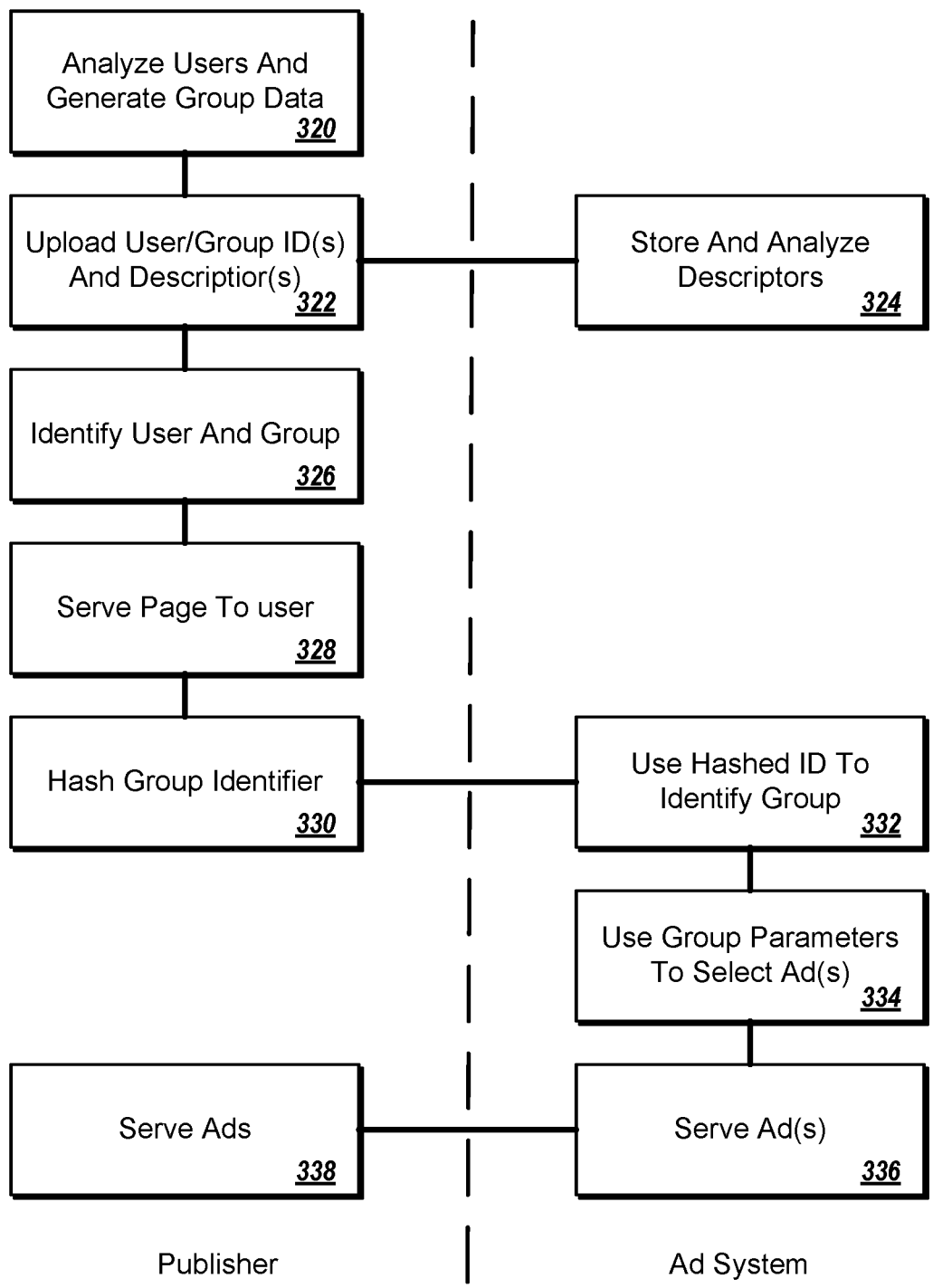

FIGS. 3A and 3B are flow charts of processes for providing grouped user information and targeting advertisements to the group. The processes are similar to those discussed, with regard to FIGS. 2A and 2B, respectively, and may be implemented according to the system shown in FIGS. 2A and 2B.

FIG. 3A shows a process by which the only group data provided by a publisher to an ad system is a group identifier. The process begins at box 302, where a publisher identifies a user and groups that the user may belong to. The processes described here are on-going, continuously-updated processes, so the identification of the user and his groups may occur after the publisher has been operating for a time. For example, at some point in its history, the publisher may have performed an analysis of it user's self-posted profiles, their activity commenting on articles or other such activity permitted under their agreement with their users and communicated to the users. When the particular user addresses here signs up with the system, the user may fill out a profile, and the system may assign the user to one or more of the groups, similar to the groups discussed above as examples. Also, the user may wait to assign the user to a group until after the user has subscribed to particular areas of the publisher's site or otherwise indicated what the user's interests are. Also, as the user further interacts with the publisher's site after being assigned to one or more groups, the publisher may reassign the user to additional or different groups over time.

At some point, the user will visit the publisher and request delivery of a page of content. For example, the user may click on a link for an article on the front page of a newspaper's web site. In well-known manners, the action of the user will cause the publisher's system to serve the page to the user (box 304). Included on the page may be one or more ad slots, which may cause certain code to be executed on the user's system, such as code that causes an ad request to be delivered to an ad system, where the request includes a group identifier (box 306) that identifies to the ad system one of the groups that had been established by the publisher. The communication can also include an identifier of the publisher, so that the ad system may correlate the publisher's groups to stored information at the ad system regarding interactions that members of the groups have previously had with ads served by the ad system.

At box 308, the ad system identifies a profile for the publisher and for the identified group. For example, the publisher profile may indicate that the publisher's users are likely to have certain values for various characteristics. For example readers of the New York Times may generally have different values for characteristics than do readers of the Wall Street Journal or USA Today. This profile may be an overarching profile that is applied in selecting any ads to be displayed with the publisher's content. Also, certain advertisers may have identified certain publishers whose content that they do or do not want their ads displayed with on-line. The advertiser profile may be used to make such determinations when selecting ads to serve back to the user.

The group profile may be built up form statistical analysis of behavior of members of the group over time in response to being displayed ads by the ad system. For example, certain ads may be determined to be aimed at particular niches, such as car lovers, sports fans, and the like. If the ads are served to the group and are clicked on a much higher or lower percentage of the time as compared to other groups, the ad system can assume a positive or negative correlation between ads having such a characteristic, and users of the group. As a result, later instances in which ads are being selected for serving to users of the publisher may be biased by such previous observations about the group.

At box 310, the ad system can select and serve the ads. Such selection may depend on a number of factors, including on an auction that takes into account the price bid by each advertiser and the determined relevance of the ad to the group. Also, the selection can depend on matching inferred characteristics of the identified group to characteristics of the ads, such as ad keywords. The matching for the group may depend on the reactions of the group members observed by the system, to previously-displayed ads.

At box 312, the ad system receives information about the ad use. Specifically, the ad system can be informed if the user clicks on one of the ads, and/or if they stay at the landing page for a sufficient period to indicate that they were interested in the ad and visited the advertiser's site for a sufficient time period. The ad system may incorporate such observations into its profile for the group that was identified at box 306. For example, if the ad relates to muscle cars, and the user clicks on the ad, the system can "push" the profile for the group slightly in the direction of muscle cars. As a result, other users from the group in the future will be more likely to be displayed a similar ad (particularly when the content of the page they are on matches the ad). As such, the ad system may update both the profile for the group (box 314) and the profile for the publisher (box 316), e.g., pushing all the users from the publisher slightly in the direction of ads like the ad that the user clicked on.

FIG. 3B shows a process for selecting ads based on anonymized group data, but where certain characteristics of the group are identified in a masked manner.

The process begins at box 320, where a publisher analyzes its data to generate groups and to assign identifiers to the groups. Such actions may occur in manners like those discussed above for box 302 in FIG. 3A. At box 322, the publisher can upload to the ad system group IDs and descriptions, and perhaps IDs for particular users. The descriptions in this example, may be hashed or otherwise masked so that the identities of user characteristics (whether individually or as a group) cannot be determined by third-parties and/or values of the characteristics cannot be determined. As an example in which a characteristic can be determined but its value cannot, the publisher may pass a characteristic of "user location" to the ad system in plain text, but may hash the users' state names or zip codes so that the ad system cannot determine the users' actual locations. The profile information for the groups can also be passed in a manner so that the ad system can identify a description of a characteristic and the value for that characteristic for the particular group, but does not obtain personal information for particular members of the group.

The ad system, at box 324, may then store and analyze the descriptors. For example, over time, the ad system may serve ads to members who identify themselves as being members of a particular group (e.g., by their browsers including a group ID with their requests for ads). The ad system may then analyze reactions to the ads by users of the groups, as discussed above. Such analysis may be cyclical, and repeated as users continue to use and be added to the system, even though a single example pass through the system is shown here.

The ad system can treat the group the same way it would treat an ordinary individual user. In particular, selections made by members of the group may be associated with particular characteristics, such as the clicking on an advertisement for motor oil being correlated with a love for cars and self-help. Thus, if members of the group click on such ads a number of times, the ad system may modify a profile for the group in the same way it would modify the profile for an individual who made such selections. However, the rate at which profile modifications are made by actions of group members may be slower than for actions for a single user, in recognition that the reactions for the group may be less uniform that reactions of a single user.

At various times, users may request content from the publisher, such as via HTTP request for content at a particular URL. In such a situation, the publisher may identify the user and/or the group the user is in (box 326). Such identification may be by accessing a cookie stored at the user's computer that identifies the user and/or the group, or by other techniques. At box 328, the publisher serves the page to the user in a familiar manner, and also provides a hashed group identifier or other hashed group information to the user. Such hashed information may then be passed from the user's terminal to the ad system (such as in the manners discussed above), which may in turn, at box 332, match the hashed identifier or other information to information previously received from the publisher at box 324.

The ad system may then identify parameters that it has previously associated with the group, such as by performing co-variance analysis within the group and across multiple groups using the correlations between various characteristic labels or hashed characteristic labels (box 334). At box 336, the ad system can serve the selected ads in a familiar manner. In many implementations, the ads will be served directly from the ad server to the web browser of the user. However, in certain implementations, the ads can be served to the publisher (which may have passed the group identifier and/or other identifying data), and the publisher may then serve them (box 328) to the user, such as by incorporating them into the web page before it is served to the user at box 328.

Although the examples above have been stated in terms of advertisements to be served to a group or groups without providing individualized information about particular members of the group, items other than advertisements could also be selected for display by an organization other than an ad system, in manner like those discussed above. For example, software applications may take the place ads in the examples above, with telecommunications carriers taking the place of publishers, and an application provider taking the place of the ad system.

For example, carriers may have a relatively large amount of information about their subscribers and may wish to maximize the experience of their subscribers when the subscribers visit a central application store (e.g., run by a company that develops an operating system that is supported by the carriers). However, the carriers may not be able to give personalized information to the provider of the application store. Rather, the carriers may form groups (e.g., by geographic region, by classifying subscribers according to the size of their calling plan, by classifying the users as leading edge (e.g., they pick up new phones as soon as they are introduced) or as followers, and the like). The carriers may also develop descriptive data about the formed groups, and may provide per-group data (though not any per-user data) to the application store provider. When particular members visit the application store, their group ID may be provided to the application store, such as in the manners discussed above, and the application store may present possible applications by targeting the characteristics of the group tat the particular carrier provided, or other characteristics that the provider of the application store has been able to infer. For example, if a large number of members of Group A have purchased Application X, then the application store may present Application X as a recommended application for subsequent members of Group A who visit the application store.

In such an implementation, users may benefit from being shown applications that are most relevant to them. Carriers may benefit by having happy subscribers, and also perhaps by obtaining a percentage of sales made to their particular subscribers, and the developer of the application store can benefit by moving more applications to users. The particular sharing of information and messages between the application store provider, the user, and the carrier, may be the same in such a situation as the sharing of information between the ad system, the user, and the publisher in the other examples above (e.g., in FIGS. 1, 2A, 2B, 3A, and 3B).

Figure 4:
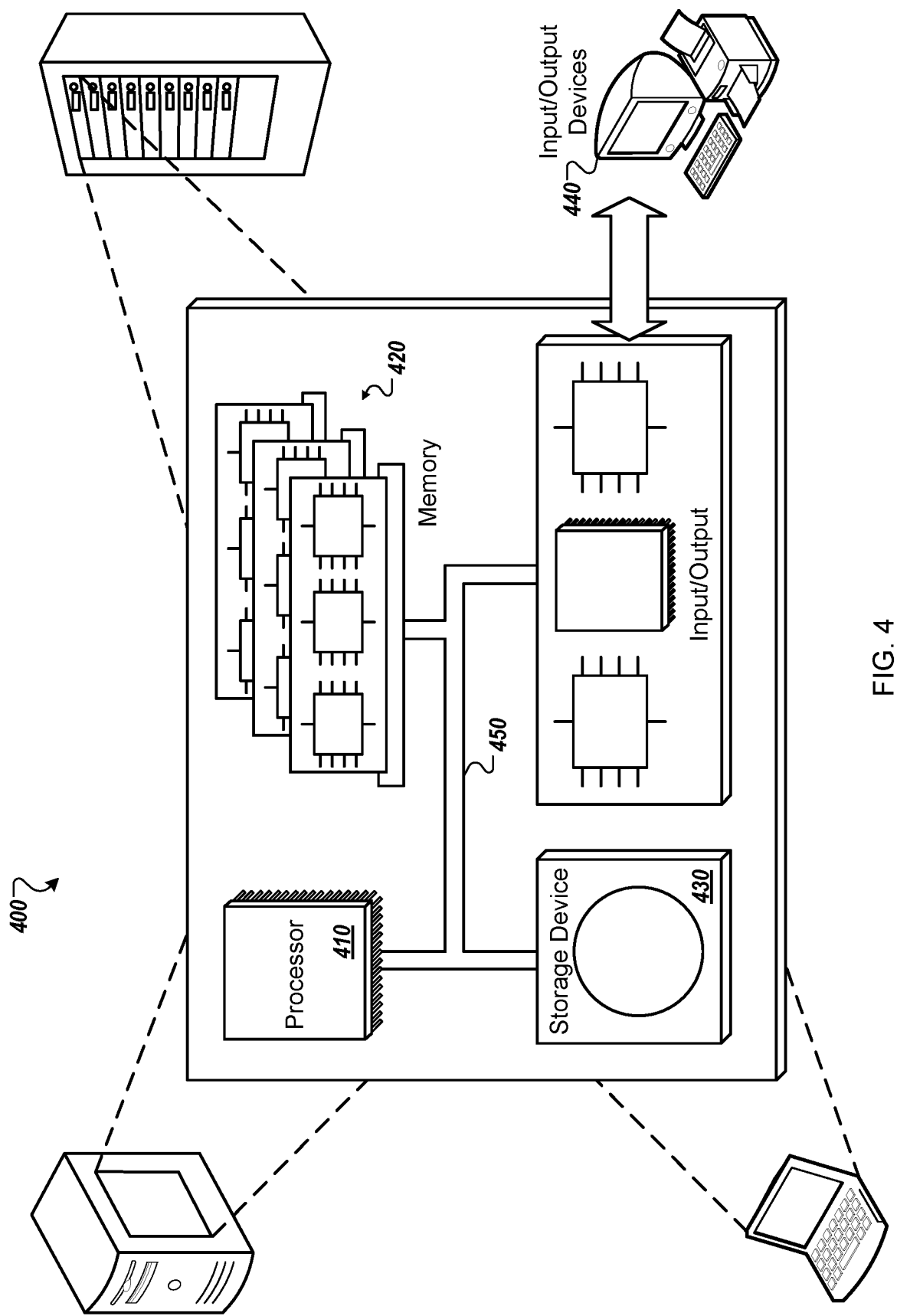
FIG. 4 is a block diagram of computing devices that may be used to implement the systems and methods described in this document, as either a client or as a server or plurality of servers.

FIG. 4 is a schematic diagram of a computer system 400. The system 400 can be used for the operations described in association with any of the computer-implement methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 800. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method, comprising:
obtaining, by one or more computers, a set of interests for a set of users;
creating, by the one or more computers, two or more user groups that each include different subsets of users from the set of users, wherein each particular user group includes only the users from among the set of users that share at least one shared interest from among the set of interests;
generating, by the one or more computers and for each particular user group, a different group identifier that identifies the particular user group, but does not identify any individual user within the particular user group;
submitting, by the one or more computers and to a content selection service, a particular group identifier that identifies a particular user group from among the two or more user groups but does not identify any individual user in the particular user group;
obtaining data specifying user activity with content distributed based on the submitted particular group identifier; and
biasing subsequent distribution of content to members of the user group identified by the particular group identifier based on the obtained data specifying the user activity;
detecting, in response to execution of an executable script embedded in code of a resource rendered at a given client device, a given group identifier of the different group identifiers that anonymously conveys the at least one shared interest of the particular user group identified by the given group identifier; and
distributing content to the given client device based on the given group identifier.

2. The method of claim 1, wherein obtaining the set of interests comprises identifying online user interactions with different content topics.

3. The method of claim 2, further comprising receiving an HTTP request from a browser executing on a client device, the HTTP request including content received by the client device from a publisher server that has provided content to the client device to which additional content is delivered.

4. The method of claim 3, wherein receiving the HTTP request comprises receiving an HTTP request that includes the particular group identifier, the method further comprising biasing distribution of the additional content based on the obtained data specifying user activity.

5. The method of claim 4, further comprising:
selecting the additional content for distribution responsive to the HTTP request without using information that identifies an individual user of the client device; and
transmitting, over the Internet, the selected additional content to the client device.

6. The method of claim 5, wherein:
obtaining data specifying user activity with content distributed based on the submitted particular group identifier comprises obtaining data specifying interaction with the additional content at the client device; and
biasing subsequent distribution of content to members of the user group based on the obtained data comprises biasing subsequent distribution of the additional content based on the obtained data specifying the interaction with the additional content at the client device.

7. An electronic system comprising:
one or more non-transitory machine-readable storage devices storing instructions;
one or more processing devices configured to interact with the one or more non-transitory machine readable storage devices and execute instructions that cause the one or more processing devices to perform operations comprising:
obtaining a set of interests for a set of users;
creating two or more user groups that each include different subsets of users from the set of users, wherein each particular user group includes only the users from among the set of users that share at least one shared interest from among the set of interests;
generating, for each particular user group, a different group identifier that identifies the particular user group, but does not identify any individual user within the particular user group;
submitting, to a content selection service, a particular group identifier that identifies a particular user group from among the two or more user groups but does not identify any individual user in the particular user group;
obtaining data specifying user activity with content distributed based on the submitted particular group identifier; and biasing subsequent distribution of content to members of the user group identified by the particular group identifier based on the obtained data specifying the user activity;

detecting, in response to execution of an executable script embedded in code of a resource rendered at a client device, a given group identifier of the different group identifiers that anonymously conveys the at least one shared interest of the particular user group identified by the given group identifier; and distributing content to the client device based on the given group identifier.

8. The electronic system of claim 7, wherein obtaining the set of interests comprises identifying online user interactions with different content topics.

9. The electronic system of claim 8, wherein the instructions cause the one or more processing devices to perform operations further comprising receiving an HTTP request from a browser executing on a client device, the HTTP request including content received by the client device from a publisher server that has provided content to the client device to which additional content is delivered.

10. The electronic system of claim 9, wherein receiving the HTTP request comprises receiving an HTTP request that includes the particular group identifier, the operations further comprising biasing distribution of the additional content based on the obtained data specifying user activity.

11. The electronic system of claim 10, wherein the instructions cause the one or more processing devices to perform operations further comprising:

selecting the additional content for distribution responsive to the HTTP request without using information that identifies an individual user of the client device; and transmitting, over the Internet, the selected additional content to the client device.

12. The electronic system of claim 11, wherein:

obtaining data specifying user activity with content distributed based on the submitted particular group identifier comprises obtaining data specifying interaction with the additional content at the client device; and biasing subsequent distribution of content to members of the user group based on the obtained data comprises biasing subsequent distribution of the additional content based on the obtained data specifying the interaction with the additional content at the client device.

13. One or more non-transitory machine-readable storage devices storing instructions that, when executed by one or more processing devices, cause the one or more processing devices to perform operations comprising:

obtaining a set of interests for a set of users;

creating two or more user groups that each include different subsets of users from the set of users, wherein each particular user group includes only the users from among the set of users that share at least one shared interest from among the set of interests;

generating, for each particular user group, a different group identifier that identifies the particular user group, but does not identify any individual user within the particular user group;

submitting, to a content selection service, a particular group identifier that identifies a particular user group from among the two or more user groups but does not identify any individual user in the particular user group;

obtaining data specifying user activity with content distributed based on the submitted particular group identifier; and biasing subsequent distribution of content to members of the user group identified by the particular group identifier based on the obtained data specifying the user activity;

detecting, in response to execution of an executable script embedded in code of a resource rendered at a client device, a given group identifier of the different group identifiers that anonymously conveys the at least one shared interest of the particular user group identified by the given group identifier; and distributing content to the client device based on the given group identifier.

14. The one or more non-transitory machine-readable storage devices of claim 13, wherein obtaining the set of interests comprises identifying online user interactions with different content topics.

15. The one or more non-transitory machine-readable storage devices of claim 14, wherein the instructions cause the one or more processing devices to perform operations further comprising receiving an HTTP request from a browser executing on a client device, the HTTP request including content received by the client device from a publisher server that has provided content to the client device to which additional content is delivered.

16. The one or more non-transitory machine-readable storage devices of claim 15, wherein receiving the HTTP request comprises receiving an HTTP request that includes the particular group identifier, the operations further comprising biasing distribution of the additional content based on the obtained data specifying user activity.

17. The one or more non-transitory machine-readable storage devices of claim 16, wherein the instructions cause the one or more processing devices to perform operations further comprising:

selecting the additional content for distribution responsive to the HTTP request without using information that identifies an individual user of the client device; and transmitting, over the Internet, the selected additional content to the client device.

18. The one or more non-transitory machine-readable storage devices of claim 17, wherein:

obtaining data specifying user activity with content distributed based on the submitted particular group identifier comprises obtaining data specifying interaction with the additional content at the client device; and biasing subsequent distribution of content to members of the user group based on the obtained data comprises biasing subsequent distribution of the additional content based on the obtained data specifying the interaction with the additional content at the client device.

* * * * *